Patented Nov. 1, 1927.

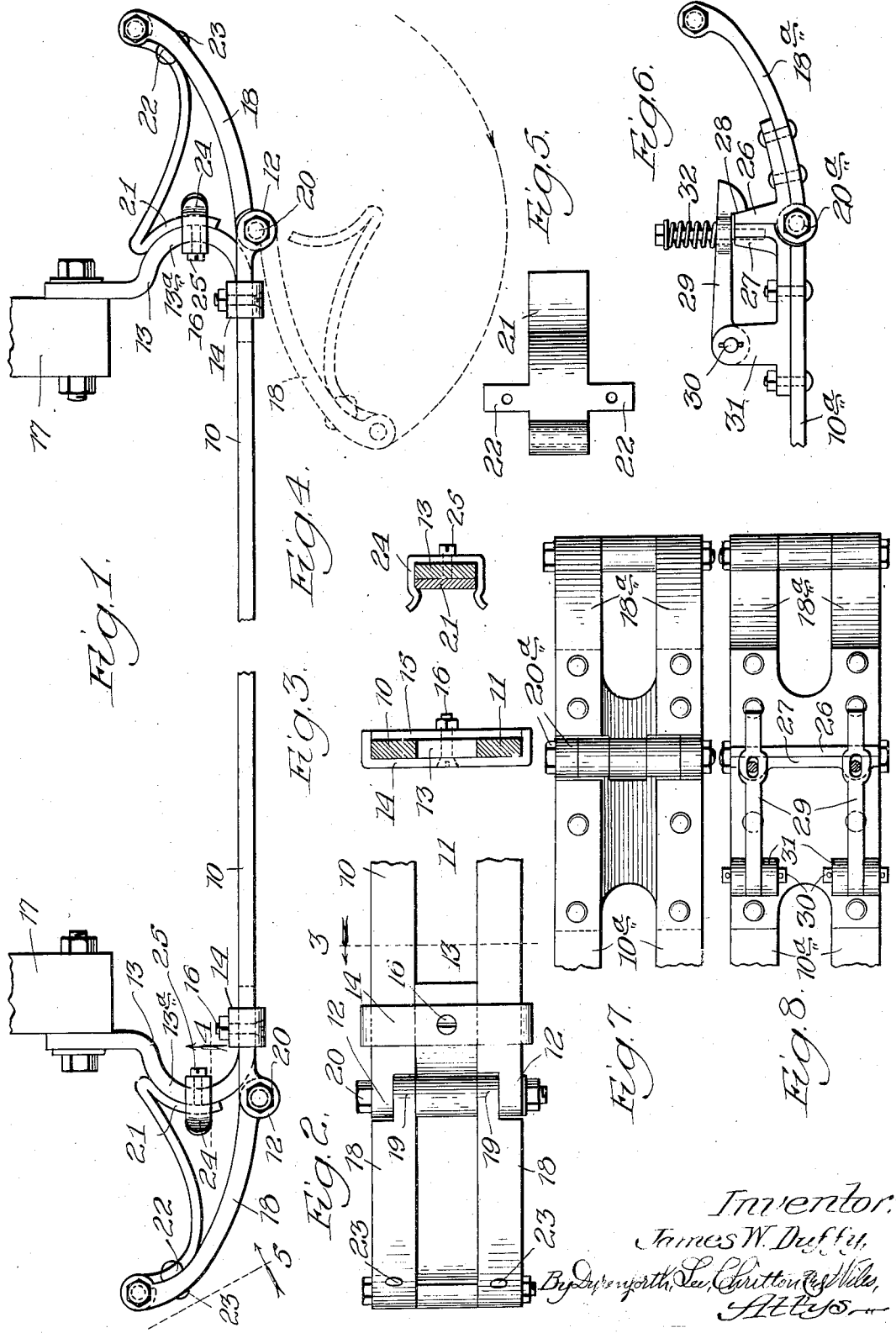

1,647,611

UNITED STATES PATENT OFFICE.

JAMES W. DUFFY, OF MAYWOOD, ILLINOIS.

AUTOMOBILE BUMPER.

Application filed February 14, 1927. Serial No. 168,079.

This invention relates to automobile bumpers and the like and has for an object the provision of a bumper which will receive and stop a blow directed toward an automobile body, but which will yield under stress or force thereon exerted away from the automobile body. The purpose of this is to prevent one car in passing another on the road from engaging its rear bumper in some part of the automobile in passing or from catching its own rear fender or other part of the automobile in the front bumper of the car which is being passed. In either case there is considerable danger that the car which is passing will engage in some way in the car which is being passed with the result that the latter car will be forced off the road and that one or both of the cars will be injured.

This and other objects which will appear hereinafter are accomplished by this invention which is fully described in the following specification and shown in the accompanying drawing, in which:

Figure 1 is a top plan view of a bumper embodying the invention;

Fig. 2 is a partial front elevation of the same;

Fig. 3 is a section on the line 3 of Fig. 2;

Fig. 4 is a section on the line 4 of Fig. 1;

Fig. 5 is a detail of the foot used in Fig. 1;

Fig. 6 is a partial plan view similar to Fig. 1 showing a modified form of the invention; and Figs. 7 and 8 are front and rear elevations respectively of the bumper shown in Fig. 6.

The embodiment illustrated comprises a bumper having spaced top and bottom bars 10 and 11 respectively which are preferably provided at their ends with hinge eyes 12. These bars are spaced apart by means of central members 13, one at each end, the members 10, 11 and 13 being secured together by means of tie-bars 14 and 15 and screws 16. The central member 13 serves also as a bracket for securing the bumper to the frame 17.

To each end of the central portion of the bumper is attached an end portion 18 which is supplied with eyes 19 which are complementary to the eyes 12 so that a bolt 20 may pass therethrough and tie the whole together. Thus it will be seen that the end portions 18 are hingedly connected to the central portion of the bumper and each of these is provided with a foot 21 which is adapted to bear upon the outwardly curved portion 13ª of the bracket 13. The foot 21 is provided with ears 22 which are secured to the members which go to make up the end portions 18 by means of rivets 23 or the like.

Each bracket 13 is provided with a clip 24 as shown in Fig. 4 which is secured thereto by means of a bolt or rivet 25. This clip is preferably of a general U-shape with slightly inwardly pressed ends which overlie the foot 21 so as to yieldably hold the foot in the position shown in Fig. 1.

This bumper is normally intended to receive a pressure exerted from the outside toward the automobile to which it is attached. For this reason the hinged end portion 18 is provided with a foot 21 which is normally in contact with its support 13 so as to resist a stress exerted in the direction of the automobile.

It sometimes happens, however, as when one automobile passes another and turns in too quickly, that a part of one automobile will engage the outer end of a bumper of the other with the result that stress is applied to the bumper tending to pull the end of the bumper around away from the body of the automobile. Should this happen with the bumper shown in Figs. 1 to 5, the spring fingers forming the ends of the U-shape member 24 will open sufficiently to permit the foot 21 to pass between them, therefore, permitting the end portion 18 to swing about the bolt 20 until it assumes the dotted line position. By this arrangement of a yieldable end on the bumper, the bumper itself is saved from injury and injury is also prevented to the fender or other part of the automobile which was in engagement therewith. To return the end of the bumper to its original normal position, the driver forces it back by means of a sharp blow to the full line position shown in Fig. 1.

In Figs. 6, 7 and 8 is shown a modified form of the device in which the outer portion 18ª is hingedly secured by means of a bolt 20ª to the central portion 10ª. In this case, the end portion 18ª carries a shoulder 26 which strikes against an abutment 27 so as to resist the force applied to the bumper in the direction of the automobile. The shoulder 26 is beveled to receive the beveled shoulder 28 of a latch 29 which is pivotally connected at 30 to a support 31, the latter being carried by the central portion 10ª. For the sake of clearness, the connection to the automobile frame 17 is omitted. If desired, this may be made a part of the casting 31 or may be secured thereto in any desired manner. The ledge member 29 is yieldably held in place by means of a spring 32.

Thus it will be seen that when any considerable force is applied to the end portion 18ª tending to force it away from the automobile, the bevel portion 26 will force the shoulder 28 and the latch 29 inwardly against the action of the spring 32 thereby causing the shoulder 26 to be released from the latch 29 so that the end portion 18ª may swing about its hinge pin 20ª to prevent damage either to the bumper itself or to any object with which the bumper is in engagement.

While I have shown and described but a few embodiments of this invention, it is to be understood that it is capable of many modifications. Changes therefore in the construction and arrangement may be made which do not depart from the spirit and scope of the invention as disclosed in the appended claims.

I claim:

1. In an automobile bumper, a central portion adapted to be secured to the frame of an automobile, an end portion adapted to extend beyond the end of the central portion and being yieldably connected thereto and having a foot adapted to bear upon a stationary part of the bumper so as to prevent the end portion from being forced back beyond a predetermined point, and a finger having a shoulder adapted to overlie said foot so as to yieldingly hold it in operative position.

2. In an automobile bumper, a central portion made up of three members secured together, the central member being adapted to be secured to an automobile frame, the side members terminating in eyelets, an end portion hingedly secured to each end of the central portion, a foot projecting from each end portion adapted to bear upon a portion of the middle portion, and yieldable means for holding said foot in operative position on said central portion.

3. In an automobile bumper, a central portion made up of three members secured together, the central member being adapted to be secured to an automobile frame, the side members terminating in eyelets, an end portion hingedly secured to each end of the central portion, a foot projecting from each end portion adapted to bear upon a portion of the middle portion, and yieldable means carried by the central member and overlapping said foot for holding said foot in operative position on said central portion.

In testimony whereof I have hereunto set my hand this 7th day of February, 1927.

JAMES W. DUFFY.